United States Patent
Lee

(10) Patent No.: US 6,460,384 B1
(45) Date of Patent: Oct. 8, 2002

(54) AUTOMATIC TRANSMISSION SHIFT ROD LOCK STRUCTURE

(76) Inventor: Chun-Chang Lee, No.8, Alley 5, Lane 15, Kweiyang St., Thaishan Village Taipei County (TW)

( * ) Notice: Subject to any disclaimer, the term of this patent is extended or adjusted under 35 U.S.C. 154(b) by 0 days.

(21) Appl. No.: 09/829,955

(22) Filed: Apr. 11, 2001

(51) Int. Cl.[7] .............................................. B60R 25/06
(52) U.S. Cl. ........................................ 70/201; 70/247
(58) Field of Search .................. 70/201, 202, 181–186, 70/237, 247

(56) References Cited

U.S. PATENT DOCUMENTS

| 3,583,184 | A | * | 6/1971 | Papale | 70/193 |
| 4,747,278 | A | * | 5/1988 | Roncelli et al. | 70/201 |
| 5,081,856 | A | * | 1/1992 | Hsu | 70/247 |
| 5,134,764 | A | * | 8/1992 | Taylor | 70/201 X |
| 5,291,764 | A | * | 3/1994 | Chang | 70/202 |
| 5,329,792 | A | * | 7/1994 | Lee | 70/201 |
| 5,546,775 | A | * | 8/1996 | Lee | 70/201 |
| 5,596,894 | A | * | 1/1997 | Lee | 70/201 |
| 5,682,777 | A | * | 11/1997 | Specht | 70/247 |
| 5,735,148 | A | * | 4/1998 | Hsiao | 70/201 |
| 5,765,413 | A | * | 6/1998 | Jung | 70/201 |
| 5,809,813 | A | * | 9/1998 | Wang | 70/201 |
| 5,921,118 | A | * | 7/1999 | Yuan | 70/201 |
| 5,983,681 | A | * | 11/1999 | Yuan | 70/201 |
| 6,131,425 | A | * | 10/2000 | Li | 70/201 |

* cited by examiner

*Primary Examiner*—Suzanne Dino Barrett
(74) *Attorney, Agent, or Firm*—Bacon & Thomas, PLLC

(57) ABSTRACT

A car lock structure built in an automatic transmission shift rod having a latching opening and a latching hole on the push rod and the push rod tube respectively, a lock cylinder and a latching board formed by the lock bracket at a position corresponding to the latching opening and the latching hole, such that when the lock cylinder is turned, the latching board will latch into the latch hole of the push rod tube and the latching opening of the push rod to form a mutually latch structure among the push rod, the push rod tube, and the lock cylinder, and the push rod is restricted and not able to move downward due to the latching effect of the latch opening.

1 Claim, 6 Drawing Sheets

AUTOMATIC TRANSMISSION SHIFT ROD LOCK STRUCTURE

BACKGROUND OF THE INVENTION

1. Field of the Invention

The present invention relates to a lock structure, more particularly to a car lock structure that is built into an automatic transmission shift rod. It provides a direct and secure locking effect to the automatic shift rod structure mainly by a latch board of the lock cylinder simultaneously latching between the push rod and the push rod tube such that the push rod, the push rod tube, and the lock cylinder form a mutually latched structure. In addition to restricting the push rod from being pressed down and forming a locking effect on the transmission shift rod, it also forms a vertical or transversal latching effect for the entire lock and prevents the lock from being damaged by unauthorized person.

2. Description of the Related Art

The traditional automatic transmission shift rod of vehicles has a core rod inside, and the core rod connects the transmission gear and the press button at the automatic transmission shift rod head. Generally the press button is disposed on the side of the transmission shift rod. When the user presses the press button by his/her thumb will directly press it transversally on the automatic transmission rod head to trigger the core rod, the push rod will release the latch between the transmission gears. Therefore, it allows the user to shift gear by pushing or pulling the rod body. The traditional lock used for the automatic transmission shift rod generally has a lock member being disposed at the press button of the automatic transmission shift rod and the lock member latches the press button so that unauthorized drives cannot shift the gear when they drive and it further prevents the car being stolen.

Further, the current automatic transmission vehicle has the press button disposed at the front-end position of the shift rod as the front pressing automatic transmission shift rod structure. The change in position to facilitate the pressing of the press button during driving and copes with the driving habit of the driver. However, the pressing of the front pressing press button is performed by the user's index finger, middle finger, and ring finger to retreat the shift rod towards the interior of the shift rod head, and press the push rod downward to trigger the core rod of the shift rod to proceed with the gear shifting motion. The motion of triggering the press button differs from the foregoing press button motion of the side pressing shift rod, and therefore its locking structure cannot directly use that for the side-pressing shift rod.

SUMMARY OF THE INVENTION

The primary objective of the present invention is to provide an automatic transmission shift rod lock structure by means of a latching opening and a latching hole on the push rod and the push rod tube respectively, and a lock cylinder and a latching board formed by the lock bracket at the position corresponsive to the latching opening and the latching hole, such that when the lock cylinder is turned, the latching board will latch into the latch hole of the push rod tube and the latching opening of the push rod to form a mutually latch structure among the push rod, the push rod tube, and the lock cylinder, and the push rod is restricted and not able to move downward due to the latching effect of the latch opening.

Another objective of the present invention is to provide an automatic transmission shift rod lock structure by means of a latching board being formed at the position corresponsive to the latching opening of the lock cylinder and the latching hole, such that when the lock cylinder is turned, the latching board latches into the latching opening and latching hole to form the mutually locked structure among the push rod, the push rod tube and the lock cylinder and prevents the press button from being pressed down in order to attain the locking effect on the shift rod. The lock cylinder cannot be removed from the lock cylinder hole or the shift rod since the latch board latches into the latch hold of the push rod tube. Similarly, the push rod tube cannot move up or down since the latch board latches the latched hole, such that the entire lock structure forms a vertical and transversal locked structure and hence prevents the lock from being damaged by unauthorized users.

To make it easier for our examiner to understand the objective of the invention, its structure, innovative features, and its performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENTS

Figure 1:
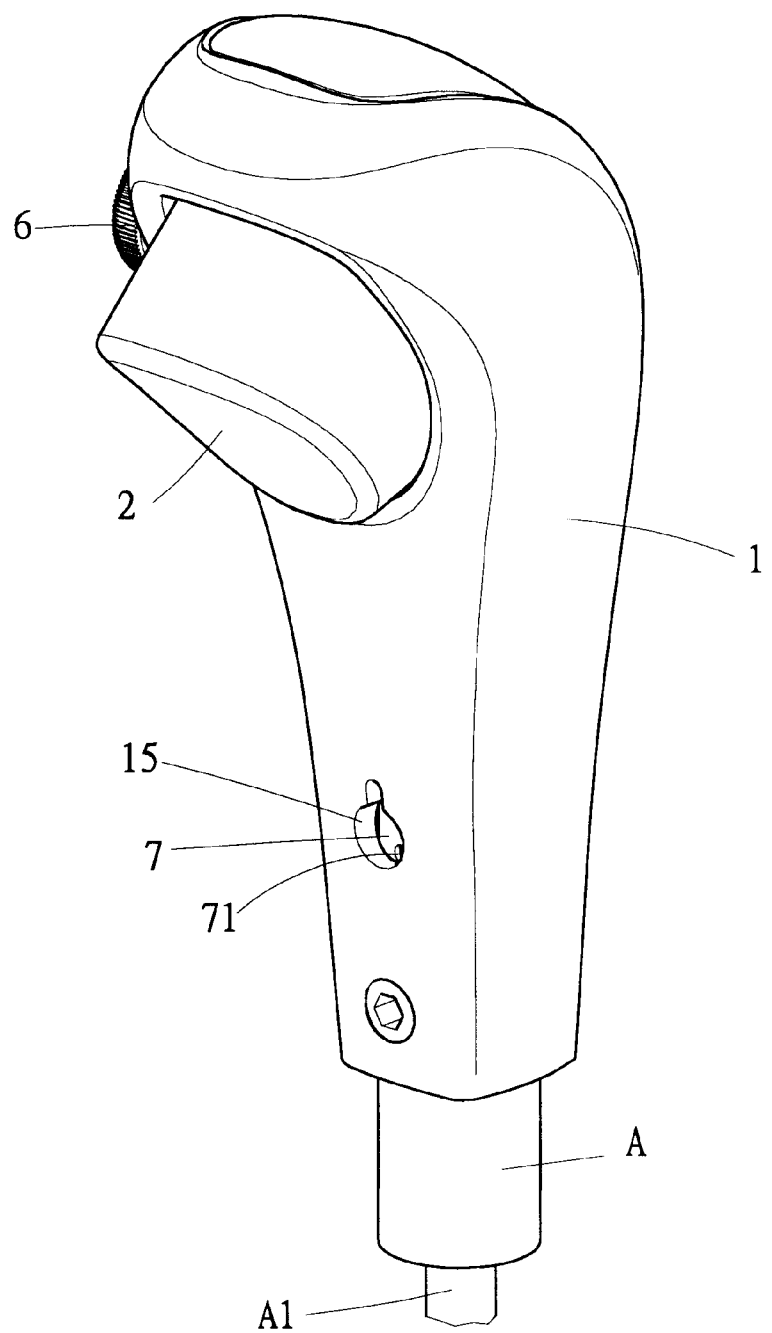
FIG. 1 shows the external structure of a preferred embodiment of the present invention.
Figure 2:
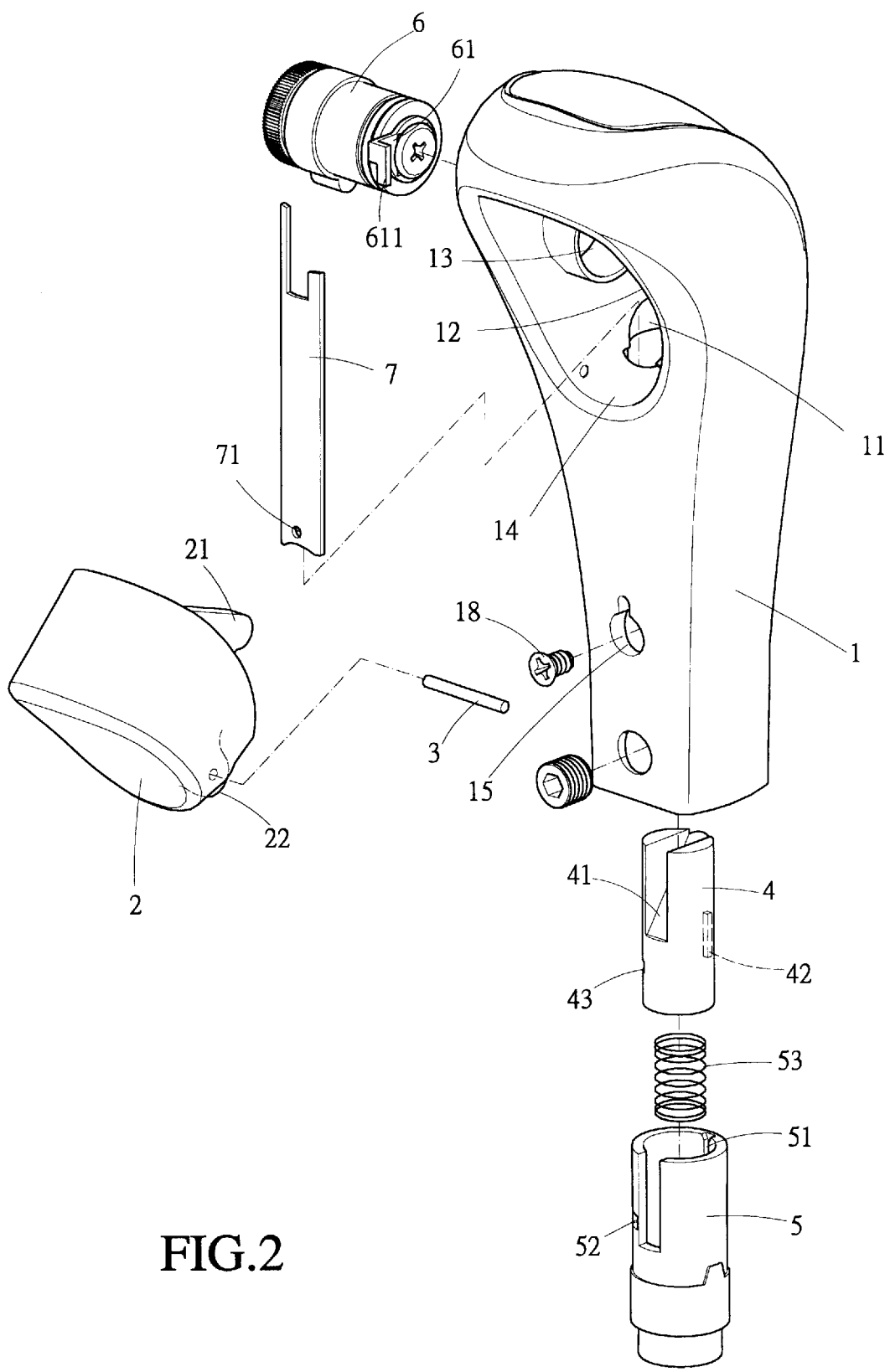
FIG. 2 shows the disassembled parts of the structure of the present invention.

The entire lock structure of the an automatic transmission shift rod lock according to the present invention as shown in FIGS. 1 and 2, mainly comprises a shift rod head (1) being disposed at the top of the shift rod (A) for user to grip; a press button (2) being disposed at the front side of the shift rod head (1); a lock cylinder (6) being disposed at a lateral side of the shift rod head (1); a push rod (4) and a push rod tube (5) being disposed in the interior of the shift rod head (1) upon the pressing of the press button, such that the push rod and push rod tube will be pressed down accordingly. Please also refer to FIG. 3 as well. In the figure, it shows that the bottom of the shift rod head (1) has a penetrating hole (11) for accommodating the shift rod tube (A), and the penetrating hole (11) extends to the interior of the shift rod head (1) and forms an accommodation chamber (12) which faces a press button hole (14) at the front side of the shift rod head (1), and it forms a penetrating lock cylinder hole (13) facing sideway, wherein a coupling ear (22) is disposed the bottom of the press button (2) to facilitate a coupling rod (3) to pass through the bottom of the press button (2) and the bottom of the press button tube hole (14) such that the press button (2) will retreat along the axis of the coupling rod (3) towards the accommodation chamber (12), and the lock cylinder (6) can coupled directly to the lock cylinder hole (13), and the push rod tube (5) being coupled to the penetrating hole (11) of the shift rod head (1), and the push rod (4) being coupled to the push rod tube (5). Furthermore, the top of the push rod (4) has an inclined plane (41) to works together with the press button (2) at the interior of the shift rod head (1) and forms a pushing section (21) on its side for pushing the inclined plane (41) of the push rod (4). When the user presses the press button (2) towards the accommodation chamber (12), it retreats such that the pushing section (21) will press again the inclined plane (41) and pushes the push rod (4) downward, as shown in FIG. 4. When the push rod (4) moves downward, it can directly push the core rod (A1) of the shift rod (A) down, and enable the user to shift gears.

Figure 3:
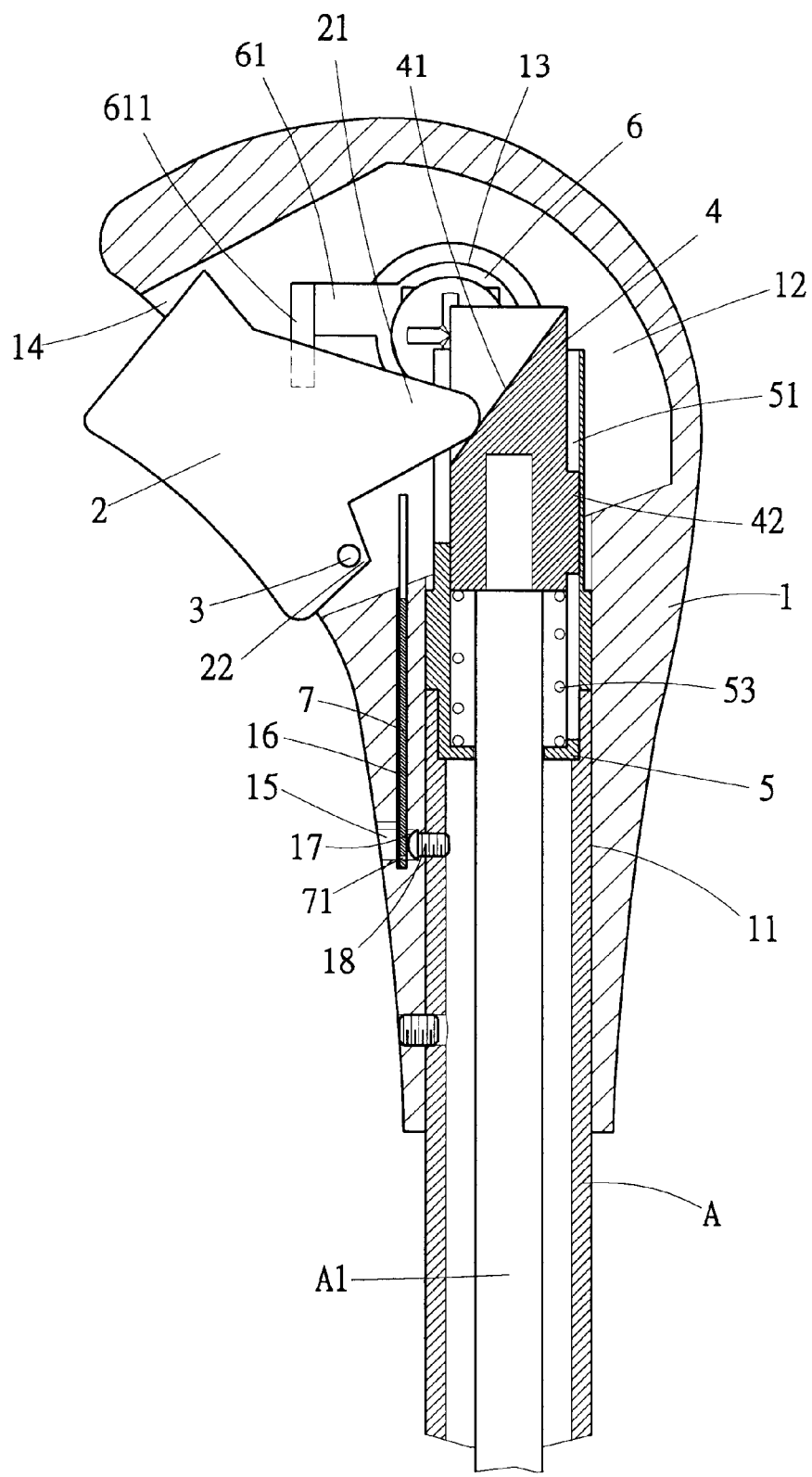
FIG. 3 shows the cross-sectional structure of the present invention.
Figure 4:
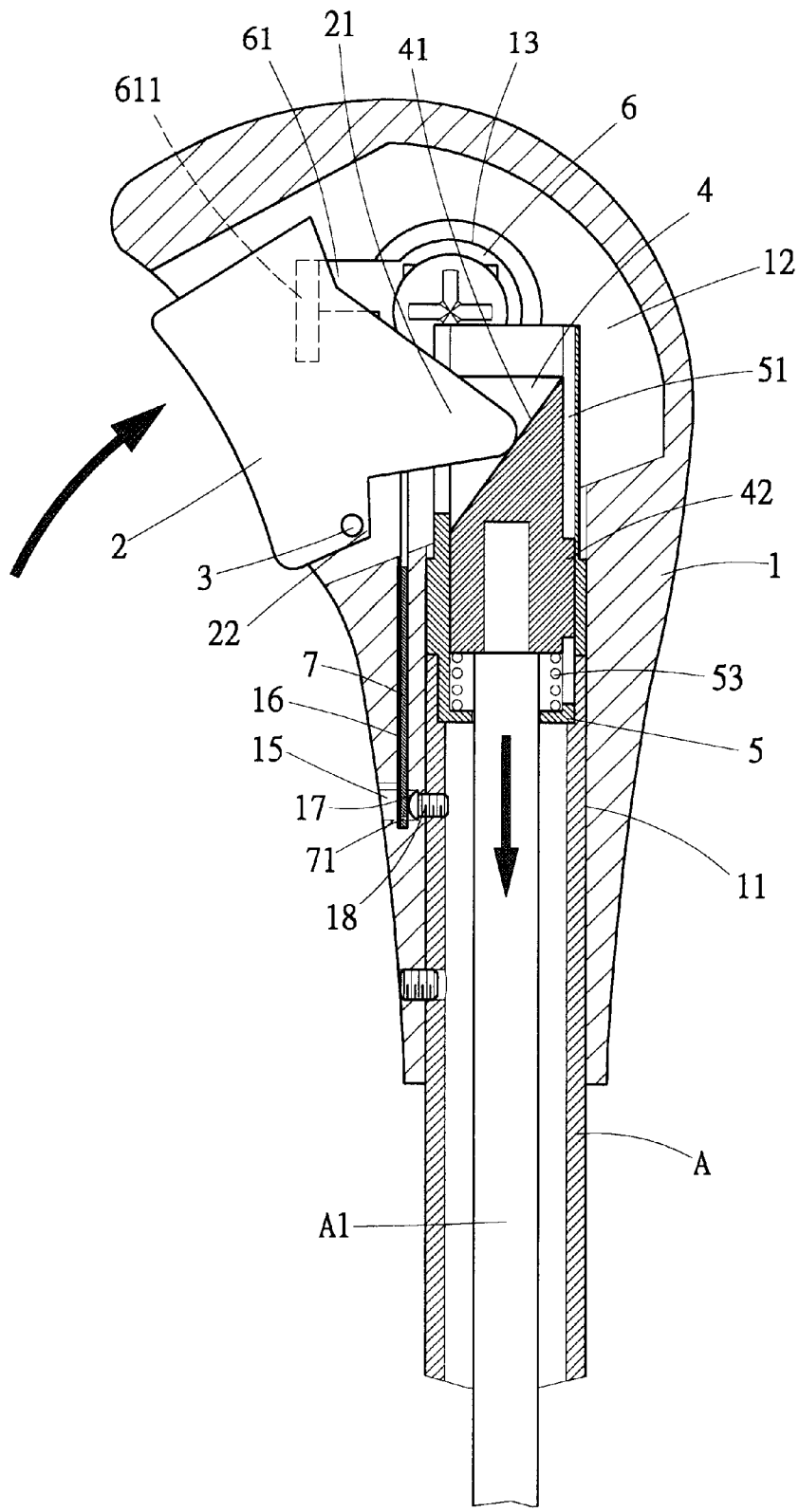
FIG. 4 illustrates the motion of the core rod of the shift rod by pressing the press button according to the present invention.
Figure 5:
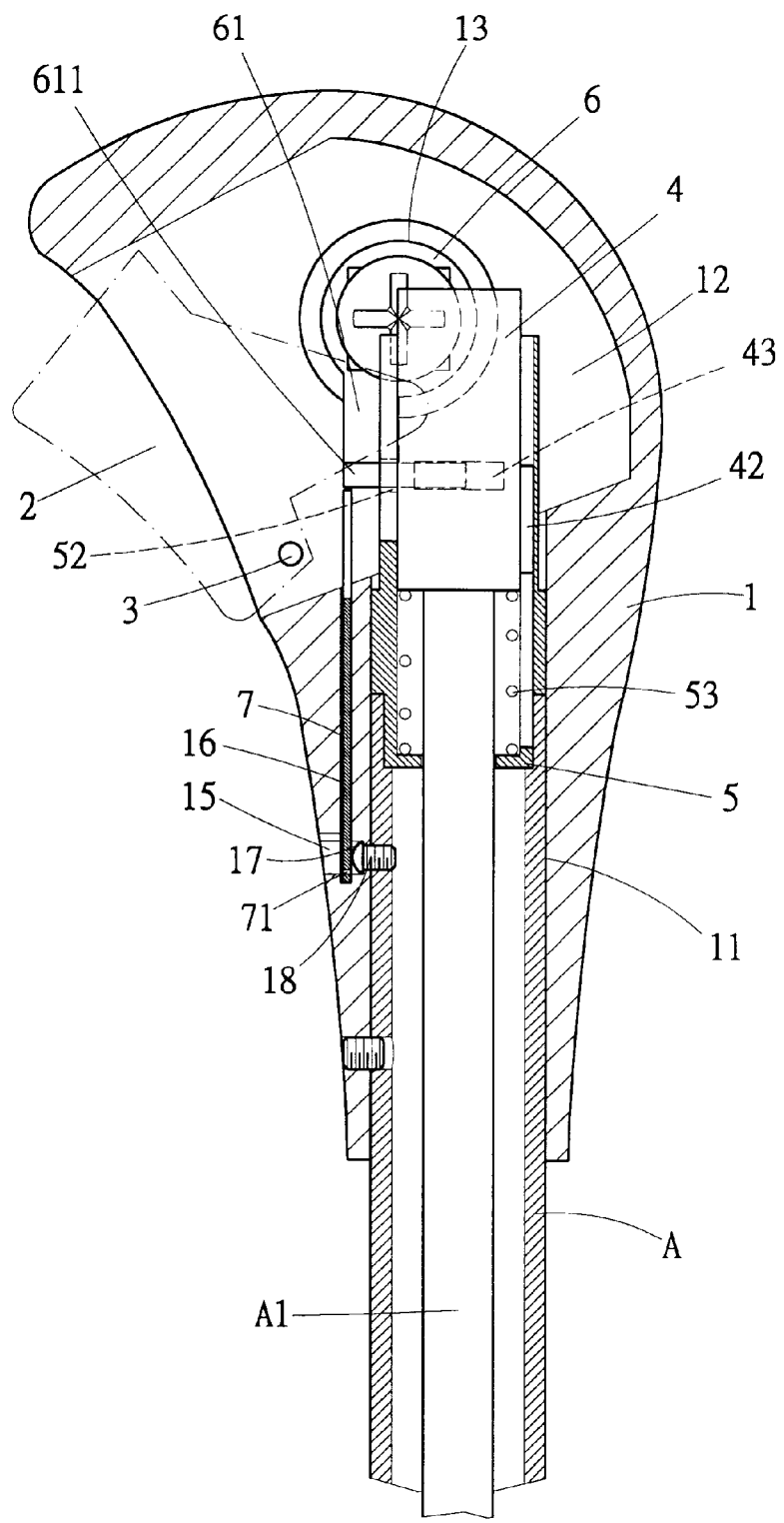
FIG. 5 shows the cross-section of the entire lock of the present invention when it is in the locked position.

Please refer to FIGS. 3 and 5. A transversal latching opening (43) is formed on a side of the push rod (4), and a latch hole (52) corresponding to the latching opening (43) is formed at the height corresponsive to the latching opening (43) at the push rod tube (5), and at the position between the push rod (4) and the push rod tube (5) it forms a vertical protruding bar (42) and a restricting groove respectively. By means of the restriction by the protruding bar (42) and restricting groove (51), the push rod (4) and the push rod tube will not be free to rotate, and restrict the push rod (4) to restore to the rising status for every up and down movement, and the latching opening (43) of the push rod (4) will exactly match with the latching hole (52) of the push rod tube (5). The push rod (4) has the restoring action to rise upward, and forms an external pushing action by pressing the push rod (4) in the opposite direction from the press button (2).

Figure 6:
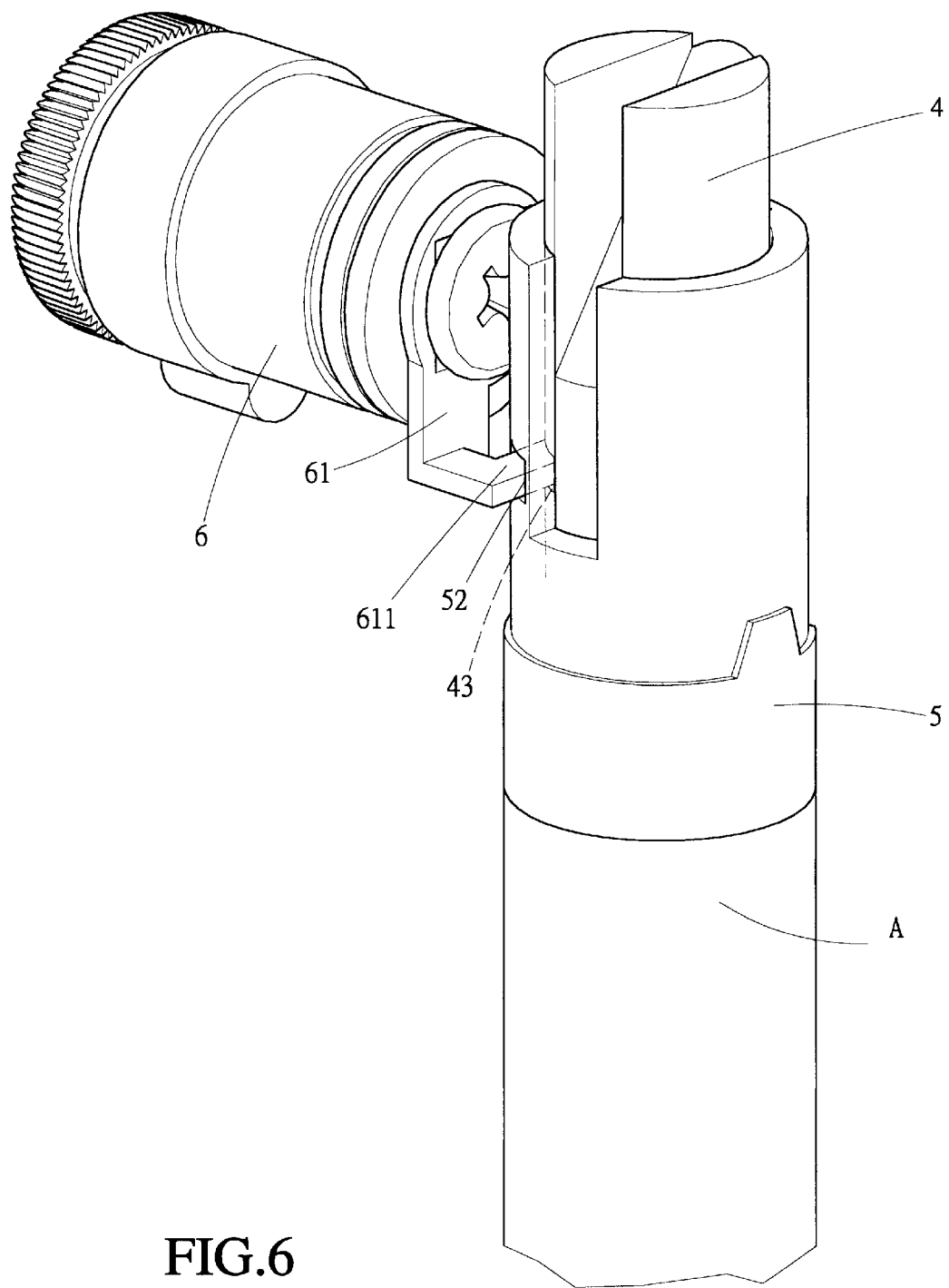
FIG. 6 shows the structure between the lock cylinder and the push rod tube of the present invention when it is in the locked position.

As to the lock cylinder (6) that has a locking effect on the shift rod (A) according to the present invention, it forms a latching board (611) at the position where it passes through the lock bracket (61) inside the shift rod head. The latching board simultaneously passes through the latch opening (43) of the push rod (4) and the latch hole (52) of the push tube (5). Please refer to FIGS. 5 and 6. When the lock cylinder is turned to a certain angle, the latching board (611) of the lock bracket (61) will latch into the latch hole (52) of the push rod tube (5) and the latch opening (43) of the push rod (4) such that the push rod (4), the push rod tube (5), and the lock cylinder (6) form a mutually locked structure. The push rod (4) cannot move downward due to the latching of the latch opening, and the press button (2) cannot be pressed downward and hence the shift rod (A) is in the locked position. The lock cylinder (6) cannot be removed from the lock cylinder hole (13) of the shift rod head (1) due to the latching board (611) latches into the latch hole (52) of the push rod tube (5). Similarly, the push rod tube (5) cannot be moved up and down due to the insertion of the latching board (611) into the latch hole (52). Such arrangement forms a vertical and transversal latch structure to the entire lock structure in order to prevent the lock structure from being damaged.

In addition, the automatic transmission shift rod head (1) as shown in FIGS. 2 and 5, forms a penetrating screw hole (15) on the external wall of the coupling section between the shift rod (A) and the shift rod head (1). In the interior of the penetrating hole (15), it forms a straight groove hole (16) penetrating into an accommodation chamber (12), and the straight groove hole (16) forms a fish-eye hole (17) corresponding to the other side of the penetrating screw hole (15). A screw (18) can be passed through the fish-eye hole (17) and locked into the rod body of the shift rod (A) and hence locks the shift rod head (1) and the shift rod (A) as an integral part. A sheltering board (7) can be installed onto the straight groove hole (16) and used to shelter the penetrating screw holes (15). The top of the sheltering board cannot be shifted upward due to the blocking by the latching board (611) of the lock bracket (61) when the lock structure is in locked position. It definitely can shelter the screw (18) and prevents it from being loosened and damaged, and when the lock structure is in unlocked position, the lock bracket (61) releases the blocking of the sheltering board (7) due to a rotation. Then the user can use a needle to trigger the triggering hole (71) at the bottom of the sheltering board to move the sheltering board (7) upward and to facilitate the user to loosen the screw (18).

The automatic transmission shift rod lock structure of the present invention is a structure by means of simultaneously inserting the latching board of the lock cylinder into the push rod and the push rod tube which does not only have a direct and secure locking effect to the automatic shift rod, but also forms a mutually locked structure by the push rod, the push rod tube, and the lock cylinder, such that it forms a vertical and transversal latching effect to the entire lock structure and prevents the lock structure from being damaged.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic transmission shift rod lock structure comprising:
   (a) a rod head fixed at the top of a rod body of an automatic transmission shift rod, a press button at a front side of the rod head, and a push rod having an internal core rod that will move downwardly upon pressing the press button and triggering the internal core rod;
   (b) the push rod having a latching opening on a side thereof and being sleeved in a push rod tube, the push rod tube having a latching hole corresponding to the latching opening, a lock cylinder coupled to a lateral side of the rod head, a latching board provided at a position corresponding to the latching opening of the lock cylinder and the latching hole such that when the lock cylinder is turned, the latching board latches into the latching opening and latching hole to form a locking assembly that includes the push rod, the push rod tube and the lock cylinder, and locking the shift rod by preventing the press button from being pressed down; and
   (c) a screw hole provided at coupled wall sections of the rod head and shift rod, a straight groove hole extending from the screw hole to an accommodating chamber in the rod head, a fish-eye hole on a side of the screw hole corresponding to the straight hole, a screw passing through the fish-eye hole and into the screw hole for locking the rod head to the shift link, and a sheltering board disposed in the straight groove hole for sheltering screw hole, the sheltering board being prevented from shifting upwardly by the latching board when the lock cylinder is in a closed position in order to protect the screw.

* * * * *